United States Patent
Watanabe et al.

(10) Patent No.: US 12,444,048 B2
(45) Date of Patent: Oct. 14, 2025

(54) DIAGNOSIS ASSISTANT APPARATUS, DIAGNOSIS ASSISTANT METHOD, AND NON-TRANSITORY COMPUTER READABLE MEDIUM

(71) Applicant: CANON MEDICAL SYSTEMS CORPORATION, Otawara (JP)

(72) Inventors: Kohei Watanabe, Utsunomiya (JP); Atsuko Sugiyama, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 231 days.

(21) Appl. No.: 18/321,110

(22) Filed: May 22, 2023

(65) Prior Publication Data

US 2023/0386027 A1 Nov. 30, 2023

(30) Foreign Application Priority Data

May 26, 2022 (JP) ................................. 2022-086128

(51) Int. Cl.
*G06T 7/00* (2017.01)
*G16H 50/30* (2018.01)

(52) U.S. Cl.
CPC .......... *G06T 7/0012* (2013.01); *G16H 50/30* (2018.01); *G06T 2207/30068* (2013.01); *G06T 2207/30096* (2013.01)

(58) Field of Classification Search
CPC ......... G06T 7/0012; G06T 2207/30068; G06T 2207/30096; G16H 50/30
See application file for complete search history.

(56) References Cited

U.S. PATENT DOCUMENTS 11,994,522 B2 * 5/2024 Wang ................... A61B 5/4064
2020/0041492 A1 2/2020 Demaria

FOREIGN PATENT DOCUMENTS

JP 2020-511674 A 4/2020

OTHER PUBLICATIONS

Bosch et al, "Multitarget Stool DNA Test Performance in an Average-Risk Colorectal Cancer Screening Population", 2019, Am J Gastroenterol 2019;114: pp. 1909-1918 (Year: 2019).*
Whitehouse et al, "Blood Biomarkers and Structural Imaging Correlations Post-Traumatic Brain Injury: A Systematic Review", 2021, Neurosurgery vol. 90, issue 2, pp. 170-179 (Year: 2021).*
Perez, A. et al "The effects of LIPUS on ctDNA release in the medium of NSCLC cell lines" Annals of Oncology, vol. 28, Supplement 6, (2017), 2 Pages.
Förnvik, D. et al. "Detection of circulating tumor cells and circulating tumor DNA before and after mammographic breast compression in a cohort of breast cancer patients scheduled for neoadjuvant treatment" Breast Cancer Res Treat 177, 447-455 (9 pages) (2019).

* cited by examiner

*Primary Examiner* — David F Dunphy
(74) *Attorney, Agent, or Firm* — Oblon, McClelland, Maier &Neustadt, L.L.P.

(57) ABSTRACT

A diagnosis assistant apparatus according to an embodiment includes a processor. The processor acquires a first measured value of a biomarker in a first liquid sample that is collected from a subject before a physical stimulus is applied and a second measured value of the biomarker in a second liquid sample that is collected from the subject after the physical stimulus is applied. The processor performs a determination on at least one of presence/absence and a property of a lesion based on the first measured value and the second measured value.

15 Claims, 4 Drawing Sheets

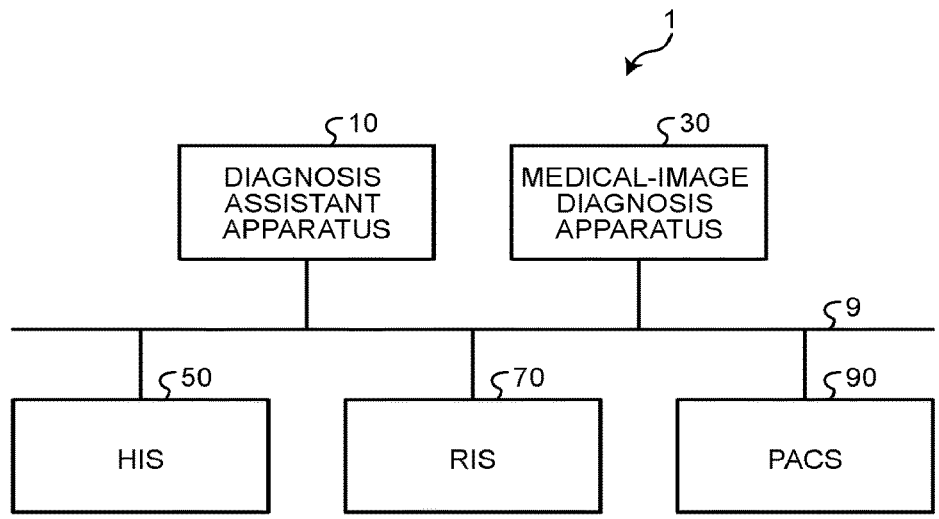
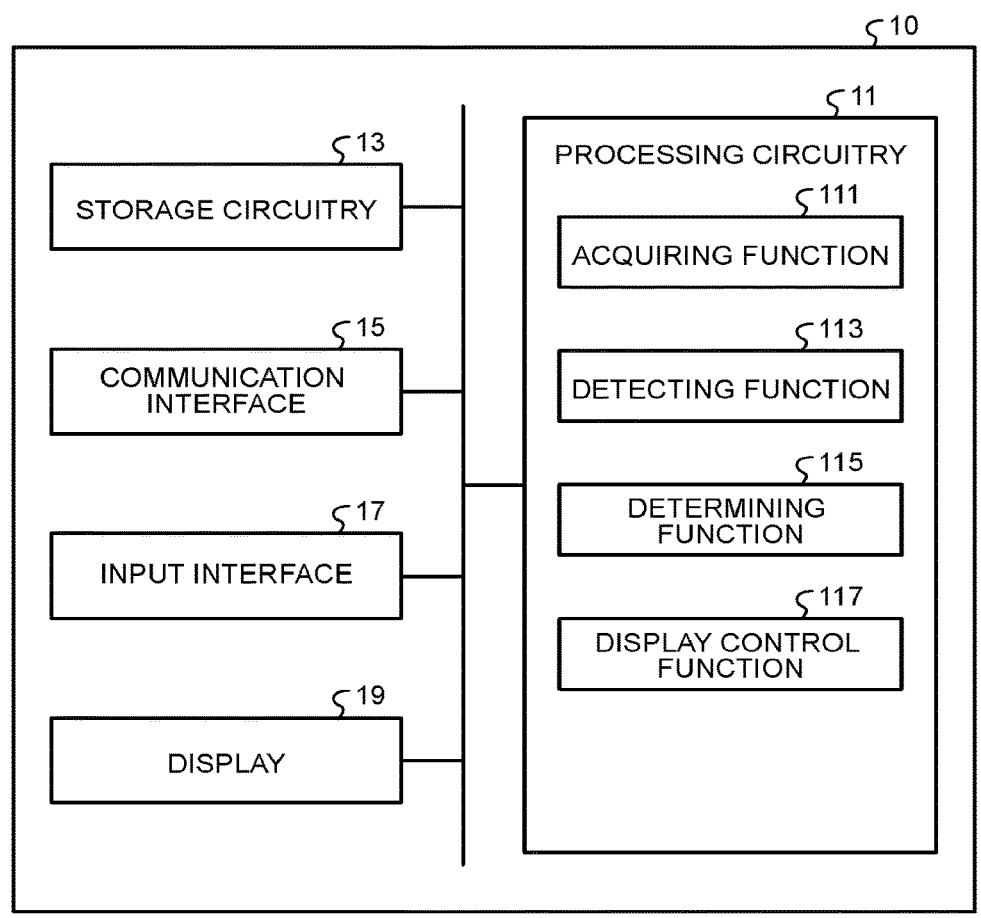

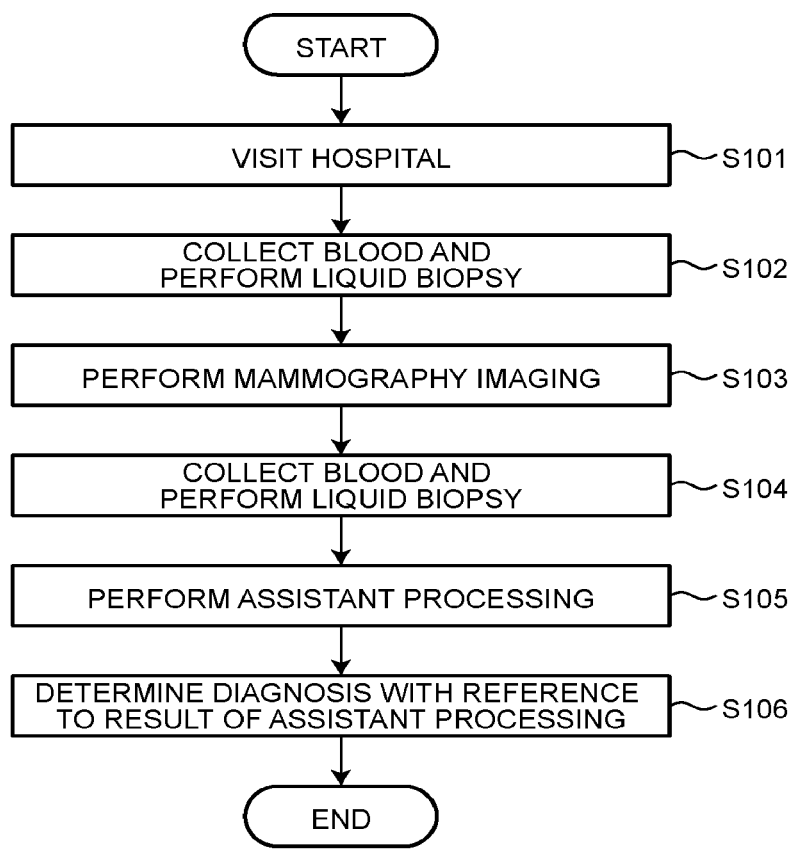

FIG.5

|       | MG-  | MG-/+ | MG+ |
|-------|------|-------|-----|
| LB-   | −    | −     | +   |
| LB-/+ | −    | −/+   | +   |
| LB+   | +    | +     | +   |

FIG.6

|       |      | MG-  | MG-/+ | MG+ |
|-------|------|------|-------|-----|
| LB-   | ΔLB- | −    | −     | +   |
|       | ΔLB+ | −    | +     | +   |
| LB-/+ | ΔLB- | −    | −     | +   |
|       | ΔLB+ | +    | +     | +   |
| LB+   |      | +    | +     | +   |

DIAGNOSIS ASSISTANT APPARATUS, DIAGNOSIS ASSISTANT METHOD, AND NON-TRANSITORY COMPUTER READABLE MEDIUM

CROSS-REFERENCE TO RELATED APPLICATION(S)

This application is based upon and claims the benefit of priority from Japanese Patent Application No. 2022-086128, filed on May 26, 2022; the entire contents of which are incorporated herein by reference.

FIELD

Embodiments disclosed in the present specification and drawings relate to a diagnosis assistant apparatus, a diagnosis assistant method, and a non-transitory computer readable medium.

BACKGROUND

In recent cancer screening tests including a breast-cancer screening test, liquid biopsies may be performed along with diagnostic imaging, such as mammography or echography. It has been known that an amount of a biomarker in blood may increase along with a physical stimulus to a site including a lesion, for example, an ultrasonic irradiation or a breast compression for mammography imaging.

Due to this, there is a problem in liquid biopsies that the accuracy of determination cannot be ensured when the measured amount of the biomarker is on or near the borderline of determination. With a situation where the accuracy of determination cannot be ensured, there is a possibility that a lesion cannot be diagnosed appropriately.

BRIEF DESCRIPTION OF THE DRAWINGS

FIG. 1 is a diagram illustrating an example of structure of a diagnosis assistant system according to an embodiment;

FIG. 2 is a diagram illustrating an example of structure of a diagnosis assistant apparatus according to the embodiment;

FIG. 3 is a flowchart illustrating an example of a workflow for diagnosis assistant according to the embodiment;

FIG. 5 is a diagram explaining an example of a determination condition for a primary determination in the assistant processing according to the embodiment; and FIG. 6 is a diagram explaining an example of a determination condition for a secondary determination in the assistant processing according to the embodiment.

DETAILED DESCRIPTION OF THE PREFERRED EMBODIMENTS

Figure 4:
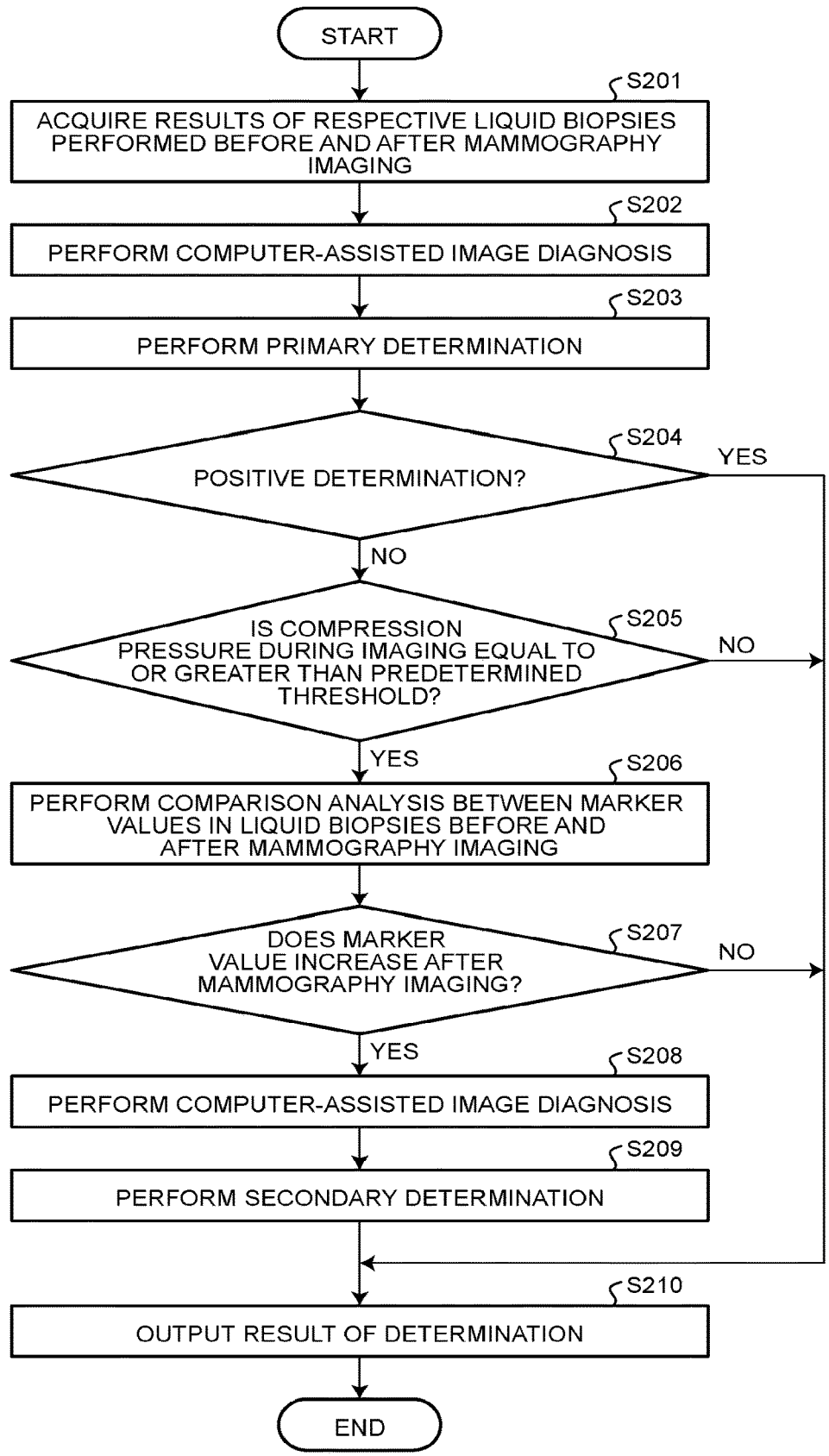
FIG. 4 is a flowchart illustrating an example of a sequence of assistant processing performed by the diagnosis assistant apparatus according to the embodiment.

A diagnosis assistant apparatus according to an embodiment includes a processor. The processor acquires a first measured value of a biomarker in a first liquid sample that is collected from a subject before a physical stimulus is applied and a second measured value of the biomarker in a second liquid sample that is collected from the subject after the physical stimulus is applied. The processor performs a determination on at least one of presence/absence and a property of a lesion based on the first measured value and the second measured value.

A diagnosis assistant apparatus, a diagnosis assistant method, and a program according to embodiments are described below with reference to the drawings. Note that, for a component having the same or substantially the same functionality as one that has already been explained in association with an already-explained drawing, the component is denoted with the same reference numeral or sign, and its explanation is repeated only when such explanation is necessary. Moreover, there may be ones that represent the same part but have different dimensions or ratios from each other depending on drawings. Furthermore, in perspective of ensuring the visibility of the drawings for example, for the explanation of the respective drawings, only main components may be denoted with their reference numerals or signs, while the others components may not be denoted with their reference numerals or signs even if any of them has the same or substantially the same functionality.

In recent cancer screening tests including a breast cancer screening test, liquid biopsies may be performed along with diagnostic imaging, such as mammography or echography. It has been known that an amount of a biomarker in blood may increase along with a physical stimulus to a site including a lesion, for example, an ultrasonic irradiation or a breast compression for mammography imaging. It has been known, for example, that concentrations of CTC and ctDNA in blood may change before and after a breast compression. It has also been know that irradiation of a low intensity pulsed ultrasound (LIPUS) may increase an emission of ctDNA in blood from a lung cancer cell line.

Due to this, there is a problem in liquid biopsies that even when the amount of biomarker increases along with a physical stimulus, its accuracy of determination cannot be ensured when the measured amount is on or near the borderline of determination. With a situation where the accuracy of determination cannot be ensured, there is a possibility that a lesion cannot be diagnosed appropriately.

To solve the problem, the present disclosure discloses a diagnosis assistant system 1 that allows appropriate assistant for diagnosis with a liquid biopsy. More particularly, the present disclosure discloses the diagnosis assistant system 1 that can improve an accuracy of determination with a liquid biopsy on at least one of presence/absence and property of a lesion.

First Embodiment

FIG. 1 is a diagram illustrating an example of structure of the diagnosis assistant system 1 according to an embodiment. As illustrated in FIG. 1, the diagnosis assistant system 1 includes a diagnosis assistant apparatus a medical-image diagnosis apparatus 30, a hospital information system (HIS) 50, a radiology information system (RIS) 70, and picture archiving and communication systems (PACS) 90. The respective apparatuses of the diagnosis assistant system 1 are installed on a hospital, for example, and they can communicate with another apparatus via a network 9, such as an intra-hospital local area network (LAN). Note that the HIS 50 may be connected to an external network in addition to the intra-hospital LAN.

The HIS 50 is a system that manages information generated in the hospital. The information generated in the hospital includes patient information, test order information, and the like. Each record included in the patient information has patient ID, name of patient (name), age (birth day, month, and year), sex, height, weight, blood type, and the like as items. Each record included in the test order information has test ID for identifying a test, patient ID, information indicating inpatient or outpatient, test code, medical treatment subject, test type, test site, date and time of test scheduled, and the like as items.

The test ID is issued when the test order information is input, the test ID being an identifier for uniquely identifying a piece of test order information in the single hospital, for example. The patient ID is an identifier that is assigned to each patient to, for example, uniquely identify the patient in the single hospital. The test code is an identifier for uniquely identifying a test that is defined in the single hospital, for example. The medical treatment subject indicates a segmentation of special area of field in the medical treatment, for example. More particularly, the medical treatment subject includes internal medicine, surgery, and the like. The test type indicates a test using a medical image. The test type includes, for example, an X-ray test, a computed tomography (CT) test, a magnetic resonance imaging (MRI) test, and the like. The test site includes brain, kidney, lung, liver, and the like.

When test order information is input by a doctor who orders a test, for example, the HIS 50 sends the test order information input and patient information identified by the test order information to the RIS 70. In this case, the HIS 50 also sends the patient information to the PACS 90.

The RIS 70 is a system that manages test reservation information related to operations for radiograph test. For example, the RIS 70 receives the test order information sent from the HIS 50, accumulates the received test order information with various setting information added thereto, and manages the accumulated information as the test reservation information. More particularly, when receiving the patient information and the test order information sent from the HIS 50, the RIS 70 generates test reservation information that is necessary to operate the medical-image diagnosis apparatus 30 based on the patient information and the test order information received. The test reservation information includes information that is necessary to perform the test, for example, test ID, patient ID, test type, test site, and the like. The RIS 70 sends the generated test reservation information to the medical-image diagnosis apparatus 30.

The medical-image diagnosis apparatus 30 is an apparatus that generates medical image data based on data collected from a subject (patient). Various medical-image diagnosis apparatuses are available for the medical-image diagnosis apparatus 30 as appropriate; for example, an X-ray diagnosis apparatus, an X-ray computed tomography (CT) apparatus, a magnetic resonance imaging (MRI) apparatus, an ultrasound diagnosis apparatus, a single photon emission computed tomography (SPECT) apparatus, a positron emission computed tomography (PET) apparatus, a SPECT-CT apparatus in which a SPECT apparatus and an X-ray CT apparatus are formed as one unit, a PET-CT apparatus in which a PET apparatus and an X-ray CT apparatus are formed as one unit, etc.

The medical-image diagnosis apparatus 30 performs a test based on the test reservation information sent from the RIS 70, for example. The medical-image diagnosis apparatus 30 generates information-of-test-performed indicating a test having being performed and sends it to the RIS 70. In this case, the RIS 70 receives the information-of-test-performed from the medical-image diagnosis apparatus 30 and outputs the information-of-test-performed received to the HIS 50, etc., as latest information-of-test-performed. For example, the HIS 50 receives the latest information-of-test-performed and manages the information-of-test-performed received. The information-of-test-performed includes the test reservation information including test ID, patient ID, test type, test site, and the like and further includes date and time of test performed.

The medical-image diagnosis apparatus 30 converts the generated medical image data into a format complying to digital imaging and communication in medicine (DICOM) standards, for example. In other words, the medical-image diagnosis apparatus 30 generates medical image data having a DICOM tag added thereto as supplementary information.

The supplementary information includes, for example, patient ID, test ID, apparatus ID, image series ID, and the like, and the supplementary information is standardized in compliance with the DICOM standards. The apparatus ID is information for identifying the medical-image diagnosis apparatus 30. The image series ID is information for identifying a single imaging by the medical-image diagnosis apparatus 30, including for example site of the subject imaged, image generation time, slice thickness, slice position, etc. For example, when a CT test or an MRI test is performed, tomographic images at two or more slice positions are acquired as medical image data.

The medical-image diagnosis apparatus 30 sends the generated medical image data to the PACS 90. The PACS 90 is a system that manages various medical image data.

For example, the PACS 90 receives the patient information sent from the HIS 50 and manages the patient information received. The PACS 90 includes storage circuitry for managing the patient information. For example, the PACS 90 receives the medical image data sent from the medical-image diagnosis apparatus 30 and stores in its storage circuitry the received medical image data in association with the patient information. Note that the medical image data stored in the PACS 90 has the supplementary information added therewith including patient ID, test ID, apparatus ID, image series ID, etc. Due to this, the operator can acquire required patient information from the PACS 90 by conducting a search using a patient ID, etc. The operator can also acquire required medical image data from the PACS 90 by conducting a search using a patient ID, a test ID, an apparatus ID, an image series ID, etc.

The HIS 50 herein receives an electronic health record created by a clinician who requests the test, for example, and information-of-test-performed corresponding to the electronic health record and stores in its storage circuitry the received electronic health record and the received information-of-test-performed in association with each other. Note that because the information-of-test-performed includes test ID, patient ID, test type, test site, date and time of test performed, and the like as described above, the operator can acquire a required electronic health record from the HIS 50 by conducting a search using a patient ID, a test ID, etc. Although, in the present embodiment, the electronic health record is stored in the storage circuitry of the HIS 50, the electronic health record may be stored in storage circuitry of another apparatus included in the diagnosis assistant system 1 if a search using an ID is available.

Moreover, the RIS 70 receives an image interpretation report created for example in accordance with an input by a radiologist and information-of-test-performed corresponding to the image interpretation report, and the RIS 70 stores the received image interpretation and the received information-of-test-performed in its storage circuitry in association with each other. Note that because the information-of-test-performed includes test ID, patient ID, test type, test site, date and time of test performed, and the like as described above, the operator can acquire a required image interpretation report from the RIS 70 by conducting a search using a patient ID, a test ID, etc. Although, in the present embodiment, the image interpretation report is stored in the storage circuitry of the RIS 70, the image interpretation report may be stored in storage circuitry of another apparatus included in the diagnosis assistant system 1 if a search using an ID is available.

The diagnosis assistant apparatus 10 performs assistant processing. The diagnosis assistant apparatus 10 acquires various medical treatment data from the medical-image diagnosis apparatus 30, the HIS 50, the RIS 70, and the PACS 90 via the network 9 and performs various information processing using the acquired medical treatment data. For example, the diagnosis assistant apparatus 10 is implemented by a computer, such as a workstation, including a processor and a memory, such as a ROM or a RAM, as hardware resources. The diagnosis assistant apparatus 10 has for example an integrative viewer implemented therewith. The integrated viewer is an application that presents medical information to a user in an integrative manner. The integrative viewer may employ any form of implementation, such as web application, fat client application, or thin client application.

The medical treatment data is information indicating a medical record about patient's physical conditions, medical conditions, medical treatments, and the like that a healthcare personnel is able to know in the course of medical treatment. The medical treatment data includes data acquired under various environments, such as data acquired from different manufacture's apparatuses, apparatuses with different versions, and the same apparatus with different settings, for example. The medical treatment data is not limited to objective data, such as numerical values. It may be subjective data represented by non-numerical values, for example, characters. The medical treatment data includes, for example, test history information, image information, electrocardiogram information, vital sign information, medication history information, report information, health record information, nursing record information, referral form, hospital discharge summary, and the like. The test history information is information indicating history of a test result acquired as a result of a laboratory test, a bacteria test, etc., performed for the patient, for example. The image information is information indicating a location of a medical image acquired by imaging the patient, for example. The image information includes information indicating a location of a medical image file generated by the medical image diagnosis apparatus with which the test has been performed, for example. The electrocardiogram information is information relating to electrocardiographic waveform measured from the patient, for example. The vital sign information is basic information relating to patient's life, for example. The vital sign includes for example pulse rate, respiration rate, body temperature, blood pressure, conscious level, and the like. The medication history information is information indicating history of a dose of medicine to the patient, for example. The report information is information indicating a summary of patient's conditions and disease through interpretation of a medical image, such as an X-ray image, a CT image, an MRI image, an ultrasound image, and the like, by a radiologist in a radiology department in response to a test request from a medical doctor in a diagnosis and treatment department, for example. The report information includes image-interpretation report information indicating an image interpretation report created by a radiologist with reference to a medical image file stored in the PACS 90, for example.

The report information includes information indicating the patient ID of the patient corresponding to the medical image file with which image interpretation is performed, the patient's name, and the patient's birth day, month, and year, for example. The health record information is for example information that is input to an electronic health record by a medical doctor in a diagnosis and treatment department, etc. The health record information includes for example a medical treatment record on admission, patient's case history and medication history, etc. The nursing record information is for example information that is input to an electronic health record by a nurse, etc. The nursing record information includes a nursing record on admission, etc. The nursing record information may include a record of food services on admission, etc. The medical treatment data may further include information about accounting.

Note that the diagnosis assistant system 1 may include a vendor neutral archive (VNA) system, instead of the HIS the RIS 70, and the PACS 90. The VNA system is an integrative archive system that centrally manages various medical treatment data managed by the PACS 90 and the various systems in clinical departments (the HIS 50, the RIS 70), those produced by different manufactures. The VNA system is connected to the HIS 50, the RIS 70, and the PACS via an intra-hospital network, such as a LAN, so that they can communicate with each other, for example. Note that various information managed by and stored in the VNA system is not limited to ones acquired from systems produced by different manufactures, and it may be acquired from systems produced by a single manufacture.

FIG. 2 is a diagram illustrating an example of structure of the diagnosis assistant apparatus 10 according to the embodiment. As illustrated in FIG. 2, the diagnosis assistant apparatus 10 includes processing circuitry 11, storage circuitry 13, a communication interface 15, an input interface 17, and a display 19. The processing circuitry 11, the storage circuitry 13, the communication interface 15, the input interface 17, and the display 19 are connected to each other via a bus or the like so that they can communicate with each other.

The storage circuitry 13 stores therein various data. For example, the storage circuitry 13 stores therein image data or medical treatment data received from the medical-image diagnosis apparatus 30, the HIS 50, the RIS 70, and the PACS 90. Moreover, the storage circuitry 13 stores therein for example parameters such as various threshold values or programs for implementing assistant processing as described later. The storage circuitry 13 is implemented by, for example, a semiconductor memory chip such as a random access memory (RAM) and a flash memory, a hard disk, an optical disk, etc. Note that a storage area of the storage circuitry 13 may be in the diagnosis assistant apparatus 10 or in any external storage device connected via a network or the like. The storage circuitry 13 herein is an example of a storage unit.

The communication interface 15 controls transfer and communication of various data performed between the medical-image diagnosis apparatus 30, the HIS 50, the RIS 70, and the PACS 90. For example, the communication interface 15 receives image data or medical treatment data from the medical-image diagnosis apparatus 30, the HIS 50, the RIS 70, or the PACS 90 and outputs the received data to the processing circuitry 11. The communication interface 15 is implemented by, for example, a network card, a network adapter, a network interface controller (NIC), etc.

The input interface 17 receives various input operations from an operator, converts the received input operations into an electric signal, and outputs the electric signal to the processing circuitry 11. The input interface 17 receives various input operations made on various operation screens relating to assistant processing from an operator, for example. As an example, the input interface 17 receives an operation by an operator to input a measured value of a liquid biopsy. The input interface 17 herein is an example of an input unit.

Examples of the input interface 17 available as appropriate include a mouse, a keyboard, a trackball, a switch, a button, a joystick, a touchpad, a touch panel display, and the like. Note that, in the present embodiment, the input interface 17 is not limited to these having a physical operation member. For example, examples of the input interface 17 include electric-signal processing circuitry that receives an electric signal corresponding to an input operation from an external input device separated from the apparatus and outputs this electric signal to the processing circuitry 11. Moreover, the input interface 17 may be formed with a tablet terminal or the like that can wirelessly communicate with the body of the diagnosis assistant apparatus 10.

The display 19 displays thereon various information. The display 19 outputs a graphical user interface (GUI), etc., for receiving various operations from an operator, the GUI, etc., being generated by the processing circuitry 11, for example. The GUI for receiving various operations from an operator includes various operation screens related to assistant processing. For example, the display 19 outputs a display screen related to assistant processing, the display screen being generated by the processing circuitry 11. As an example, the display 19 outputs a display screen including a result of each determination. Any various displays are available as the display 19 as appropriate. Examples of the display 19 available include a liquid crystal display (LED), a cathode ray tube (CRT) display, an organic electro luminescence display (OELD), or a plasma display. The display 19 herein is an example of a display unit.

Note that the display 19 may be a desktop type, or it may be formed with a tablet terminal or the like that can wirelessly communicate with the body of the diagnosis assistant apparatus 10. Moreover, one or two or more projectors may be used as the display 19.

The processing circuitry 11 controls general operations of the diagnosis assistant apparatus 10. The processing circuitry 11 includes a processor and a memory such as a ROM or a RAM as hardware resources. The processing circuitry 11 performs an acquiring function 111, a detecting function 113, a determining function 115, a display control function 117, and the like, by a processor that performs a program loaded on the memory.

The processing circuitry 11 herein is an example of a processing unit. Moreover, the processing circuitry 11 that implements the acquiring function 111 is an example of an acquiring unit. Furthermore, the processing circuitry 11 that implements the detecting function 113 is an example of a detecting unit. Moreover, the processing circuitry 11 that implements the determining function 115 is an example of a determining unit. Furthermore, the processing circuitry 11 that implements the display control function 117 is an example of a display control unit.

For the acquiring function 111, the processing circuitry 11 acquires medical image data and medical treatment data from the medical-image diagnosis apparatus 30, the HIS 50, the RIS 70, or the PACS 90 via the network 9. Moreover, the processing circuitry 11 acquires a result of an operator's operation input received by the input interface 17.

As an example, for the acquiring function 111, the processing circuitry 11 acquires medical treatment data including respective measured values of a biomarker in respective liquid samples that are collected before and after a physical stimulus is applied to a target site of a subject (patient). No special limitations are applied to the liquid samples if they are samples used in a liquid biopsy. The liquid samples may be blood samples collected from a subject, lymph samples collected from a subject, or urine samples or lacrimal fluid samples collected from a subject. Note that a measured value of a biomarker may also be referred to simply as a marker value in the following explanation.

The liquid sample collected from the subject before the physical stimulus is applied is an example of a first liquid sample, and the measured value of the biomarker in this liquid sample is an example of a first measured value, respectively. Moreover, the liquid sample collected from the subject after the physical stimulus is applied is an example of a second liquid sample, and the measured value of the biomarker in this liquid sample is an example of a second measured value, respectively.

The target site of the subject to which the physical stimulus is applied may be set as appropriate depending on a disease to be diagnosed. If for example a breast cancer in a breast cancer screening test is the disease to be diagnosed, the target site is a breast of the subject. The disease to be diagnosed is not limited to breast cancer, and it may be liver cancer, kidney cancer, prostate cancer, hepatic cancer, pancreas cancer, bladder cancer, bowel cancer, stomach cancer, esophageal cancer, uterus cancer, skin cancer, lung cancer, etc.

If the disease to be diagnosed is breast cancer for example, the physical stimulus is a compression to a breast of the subject for mammography imaging by the medical-image diagnosis apparatus 30 operating as an X-ray diagnosis apparatus. Alternatively, the physical stimulus may be an ultrasonic irradiation to the target site of the subject. Note that the physical stimulus may be any external stimulus that causes the biomarker to leak from a lesion, such as a cancer, into blood. Another method may be used instead of a compression for mammography imaging or an ultrasonic irradiation.

If the disease to be diagnosed is breast cancer for example, circulating tumor cells (CTC), which are cancer-derived cells, and circulating tumor DNA (ctDNA), which is a cancer-derived DNA, may be used as the biomarker. If the disease to be diagnosed is lung cancer for example, ctDNA may be used as the biomarker. Note that one(s) may be selected as appropriate from the following as the biomarker depending on the disease to be diagnosed: cancer-derived protein, DNA, RNA, exosome, other extracellular vesicle, and tumor cell itself, those present in blood.

As an example, for the acquiring function 111, the processing circuitry 11 acquires medical treatment data including information about an intensity of the physical stimulus applied to the target site of the subject (patient).

Note that information about the marker value and the intensity of the physical stimulus is not limited to be acquired as medical treatment data. Such information may be acquired based on an operation input through the input interface 17 by a doctor, engineer, etc., who performs the test. Moreover, the marker value may be acquired from a measurement apparatus that measures an amount of the biomarker from a blood sample.

For the detecting function 113, the processing circuitry 11 performs detection of a lesion based on a medical image that has been obtained by imaging the subject. More particularly, the processing circuitry 11 performs a computer-assisted image diagnosis (CAD) as an image diagnosis based on the medical image. The CAD according to the present embodiment is one that automatically detects presence/absence of a lesion or a position of the lesion on the medical image based on a predetermined detection condition.

Note that the CAD may be one that automatically detects presence/absence of a possible lesion on the medical image based on a predetermined detection condition. In this case, the display control function 117 displays the medical image and the possible lesion by means of the display 19. Moreover, the doctor, engineer, etc., who performs the test inputs presence/absence of a lesion on the medical image via the input interface 17. Furthermore, the detecting function 113 detects presence/absence of a lesion and a position of the lesion on the medical image based on an input by the doctor, engineer, etc., who performs the test.

Note that the CAD is not an indispensable component. For example, the following aspects may be allowable in which the doctor, engineer, etc., who performs the test performs image interpretation for the medical image, and medical treatment data including a result of the image interpretation is acquired by the acquiring function 111 or a result of the image interpretation is input through the input interface 17. Moreover, another aspect may be also allowable in which the acquiring function 111 acquires medical treatment data including a result of CAD performed outside of the diagnosis assistant apparatus 10.

For the determining function 115, the processing circuitry 11 performs a determination on presence/absence of a lesion based on marker values before and after the physical stimulus is applied. The processing circuitry 11 performs a determination on presence/absence of a lesion further based on a result of image diagnosis, such as CAD.

As an example, for the determining function 115, the processing circuitry 11 performs a primary determination that determines a lesion being present when the marker value after the physical stimulus is greater than a predetermined threshold. The primary determination herein is an example of a first determination. Note that what is used in the primary determination is not limited to the marker value after the physical stimulus. The primary determination may use the marker value before the physical stimulus or a statistic value such as an average thereof.

As an example, for the determining function 115, the processing circuitry 11 calculates an index of determination on the marker values before and after the physical stimulus when the primary determination does not indicate positive, and it performs a secondary determination on presence/absence of a lesion based on the calculated index of determination.

As an example, for the determining function 115, the processing circuitry 11 calculates the index of determination when the primary determination does not indicate positive and when the intensity of the physical stimulus is greater than the predetermined threshold. As described later, for a highly invasive cancer whose biomarker leaks into blood due to a breast compression, its malignancy grading is high. Due to this, because this is applied only when the pressure of the breast compression for imaging is equal to or greater than a fixed value, it becomes possible to determine the increase in the biomarker being caused by the breast compression and improve the accuracy of detection on a cancer whose malignancy grading is high.

The secondary determination determines a lesion being present when the index of determination is greater than a predetermined threshold. That is, the secondary determination uses a determination condition different from that of the primary determination. In other words, for the determining function 115, the processing circuitry 11 changes the condition of determination on presence/absence of a lesion when the index of determination is greater than the predetermined threshold.

The index of determination herein is an amount of increase in the marker value before and after the physical stimulus, for example. Note that the index of determination may be a ratio of increase in the marker value before and after the mammography imaging. Moreover, both the amount of increase and the ratio of increase may be used as the index of determination. When both the amount of increase and the ratio of increase are used, each of them may be compared to its threshold separately, or a statistic value based on the amount of increase and the ratio of increase may be used as the index of determination and compared to its threshold.

Moreover, the processing circuitry 11 performs the secondary determination on presence/absence of a lesion further based on a result of the image diagnosis, such as CAD. Note that the processing circuitry 11 changes a detection condition for the CAD prior to the image diagnosis when the index of determination is greater than the predetermined threshold, i.e., the marker value increases after the physical stimulus.

As an example, the changing the detection condition for CAD includes changing a detection algorism for detecting presence/absence of lesion from a medical image in accordance with the type of the biomarker whose index of determination increases before and after mammography imaging. For example, a cancer that has many neovascular vessels and actively grows, i.e., a highly invasive cancer has a high risk of metastasis and has a high malignancy grading. Such a highly invasive cancer may be near a blood vessel or a lymph vessel, and its biomarker is likely to leak out due to a physical stimulus. Thus, it is assumed that the type of the biomarker increasing is correlated with a cancer's microenvironment. Therefore, the detection algorism is changed to an algorism suitable for detection at or near lymph vessels when an increase is found in the index of determination related to an invasive cancer, for example.

As an example, the changing the detection condition for CAD includes adjusting a parameter of the detection algorism that detects presence/absence of a lesion from a medical image to increase a sensitivity of detection or to change how to add contrast, etc.

As an example, the change the detection condition for CAD includes changing the detection algorism that detects presence/absence of a lesion from a medical image to an algorism in which a parameter is determined (trained) using a medical image with which an increase is found in the index of determination before and after mammography imaging. The detection algorism after the change is preferably an algorism in which a parameter is determined (trained) only using a medical image with which an increase is found in the type of the biomarker that is determined at the process of S207 that the index of determination increases.

For the display control function 117, the processing circuitry 11 displays a display screen including results of various determinations including the primary determination and the secondary determination by means of the display 19. Note that the processing circuitry 11 may display a medical image provided for image diagnosis or a display scene including a result of detection indicating a possible lesion or lesion detected by CAD by means of the display 19.

Note that the diagnosis assistant apparatus 10 according to an embodiment may be mounted on a measurement apparatus that measures an amount of the biomarker in a liquid sample in a liquid biopsy. Alternatively, the diagnosis assistant apparatus 10 may be configured to able to acquire from the measurement apparatus a measured value of the biomarker output from the measurement apparatus by wire or wirelessly or via an external storage apparatus, for example.

Note that, each of the functions 111, 113, 115, and 117 are not limited to be implemented by a single processing circuit. It is allowable to form the processing circuitry 11 by combining a plurality of independent processors together and implements the respective functions 111, 113, 115, and 117 by the respective processors performing respective programs. The respective functions 111, 113, 115, and 117 herein may be implemented in a separated or integrated manner as appropriate by a single processing circuit or two or more processing circuits.

Note that although it is exemplified the diagnosis assistant apparatus 10 that performs a plurality of functions with a single computer, the diagnosis assistant apparatus 10 is not limited thereto. Two or more functions of the diagnosis assistant apparatus 10 may be performed by separate computers. For example, functions of the processing circuitry 11, such as the detecting function 113 and the determining function 115, may be performed dispersedly by at least two computers.

Assistant processing performed by the diagnosis assistant system 1 according to the embodiment will be explained below with reference to the drawings.

FIG. 3 is a flowchart illustrating an example of a workflow for diagnosis assistant according to the embodiment. An example is described in which a breast cancer test is performed where the disease to be diagnosed is breast cancer and blood samples are used as the liquid samples. Moreover, it is exemplified that mammography imaging is used as the physical stimulus to a breast, i.e., the test site corresponding to the breast cancer.

First of all, a patient (subject) visits a diagnosis location, such as a hospital (S101). Then, a nurse, doctor, etc., who performs the test collects blood from the patient who visits the hospital to acquire a blood sample before the breast is compressed for the mammography imaging. Moreover, an engineer, doctor, etc., who performs the test performs a liquid biopsy with the collected blood sample and measures an amount of the biomarker in the blood sample collected before the breast is compressed for the mammography imaging (S102). The measured value of the biomarker (marker value) is registered from the measurement apparatus to the HIS 50 via the intra-hospital network or a storage medium, for example. Alternatively, the marker value may be input to the diagnosis assistant apparatus 10 with the input interface 17 by a personnel who performs the test or his/her assistant.

The engineer, doctor, etc., who performs the test performs mammography imaging for the patient after the collection of blood (S103). In other words, a physical stimulus is applied to a breast of the patient who is subjected to the breast cancer test after the collection of blood.

The nurse, doctor, etc., who performs the test collects blood from the patient after the breast is compressed for the mammography imaging to acquire a blood sample. Moreover, the engineer, doctor, etc., who performs the test performs a liquid biopsy with the collected blood sample and measures an amount of the biomarker in the blood sample collected after the breast is compressed for the mammography imaging (S104). The marker value may be registered to the HIS 50 in the same manner as the step S102 or input to the diagnosis assistant apparatus 10.

The engineer, doctor, etc., who performs the test performs with the diagnosis assistant apparatus 10 assistant processing based on results of the liquid biopsies for the blood samples before and after the breast is compressed for the mammography imaging (S105). The assistant processing will be explained later.

The doctor, etc., who performs the test determines a diagnosis for the breast cancer test with reference to a result of the assistant processing (S106). The result of the assistant processing is information about at least one of presence/absence or a property of a lesion in the test site, which will be described later. After that, the sequence of FIG. 3 is completed.

FIG. 4 is a flowchart illustrating an example of a sequence of assistant processing performed by the diagnosis assistant apparatus 10 according to the embodiment.

The acquiring function 111 acquires medical treatment data including results of the respective liquid biopsies performed before and after the mammography imaging (S201). Moreover, the acquiring function 111 acquires a medical image obtained by the mammography imaging. The detecting function 113 then performs a computer-assisted image diagnosis (CAD) as an image diagnosis based on the medical image (S202).

The determining function 115 performs a primary determination based on the marker values in the liquid biopsies and the result of the image diagnosis (S203). The determining function 115 performs the primary determination with reference to a determination condition predetermined and stored in the storage circuitry 13, for example. Note that processing from S201 to S203 or processing from S202 to S203 may be collectively referred to as the secondary determination.

FIG. 5 is a diagram explaining an example of a determination condition for the primary determination in the assistant processing according to the embodiment. In FIG. 5, "LB+" indicates that the marker value in the liquid biopsy is greater than a predetermined threshold (cutoff value, borderline for determination), i.e., the liquid biopsy determination is positive. Moreover, "LB−" indicates that the measured value is less than the predetermined threshold, i.e., the liquid biopsy determination is negative. Furthermore, "LB−/+" indicates that the measured value is at or near the predetermined threshold, i.e., the liquid biopsy determination is on or near the borderline. Moreover, "MG+" indicates that a lesion is detected through the image diagnosis based on the medical image obtained by the mammography imaging, i.e., the image diagnosis is positive. Furthermore, "MG−" indicates that no lesion is detected through the image diagnosis, i.e., the image diagnosis is negative. Moreover, "MG−/+" indicates that a lesion or possible lesion at or near a predetermined reference of detection is detected in the image diagnosis, i.e., the image diagnosis is on or near the borderline.

As illustrated in FIG. 5, the determining function 115 determines positive (+) in the primary determination when at least one of the liquid biopsy and the image diagnosis is positive. Moreover, the determining function 115 determines negative (−) in the primary determination when one of the liquid biopsy and the image diagnosis is negative and when the other is on or near the borderline. Furthermore, the determining function 115 determines on or near the borderline (−/+) in the primary determination when both of the liquid biopsy and the image diagnosis are on or near the borderline.

The determining function 115 determines whether or not the primary determination is positive (S204). When the primary determination is positive (S204: Yes), the determining function 115 outputs the result of determination (S210), and the sequence of FIG. 4 is completed.

When the primary determination is not positive (S204: No), the determining function 115 determines whether or not the compression pressure during the mammography imaging is equal to or greater than a predetermined threshold (S205). More particularly, the acquiring function 111 acquires medical treatment data including information indicating the compression pressure during the mammography imaging. The compression pressure during the mammography imaging may be determined for each imaging protocol or acquired by measuring the compression pressure at the imaging. Herein, the information indicating the compression pressure during the mammography imaging is information indicating the intensity of the physical stimulus. Moreover, it is assumed for example that the predetermined threshold is predetermined and stored in the storage circuitry 13 or the like, etc. When it is not determined that the compression pressure during the mammography imaging is equal to or greater than the predetermined threshold (S205: No), the determining function 115 outputs the result of determination (S210), and the sequence of FIG. 4 is completed. Note that the processing at S205 is not indispensable, and it may be unperformed in some aspects.

On the other hand, when it is determined that the compression pressure during the mammography imaging is equal to or greater than the predetermined threshold (S205: Yes), the determining function 115 performs comparison analysis between the marker values in the blood samples before and after the breast is compressed for the mammography imaging (S206). More particularly, the determining function 115 calculates the index of determination on the marker values before and after the mammography imaging. The determining function 115 then determines whether the marker value increases after the mammography imaging (S207). More particularly, the determining function 115 determines whether or not the index of determination before and after the mammography imaging is greater than a predetermined threshold. The predetermined threshold is predetermined and stored in the storage circuitry 13 or the like, for example.

When it is determined that the marker value increases after the mammography imaging (S207: Yes), the determining function 115 changes the detection condition for CAD. The detecting function 113 automatically detects presence/absence of a lesion or a position of the lesion on the medical image based on the changed detection condition (S208).

The determining function 115 performs a secondary determination based on the marker values in the liquid biopsies, the index of determination, and the result of the image diagnosis (S209). The determining function 115 performs the secondary determination with reference to a determination condition predetermined and stored in the storage circuitry 13, for example. Note that processing from S205 to S209, processing from S206 to S209, or processing from S207 to S209 may be collectively referred to as the secondary determination.

FIG. 6 is a diagram explaining an example of a determination condition for the secondary determination in the assistant processing according to the embodiment. In FIG. 6, "LB+", "LB−", "LB−/+", "MG+", "MG−", and "MG+/−" are the same as those in the example as illustrated in FIG. 5, respectively. In FIG. 6, "ΔLB+" indicates that the marker value increases after the physical stimulus, i.e., the index of determination is greater than a predetermined threshold. "ΔLB−" indicates that the marker value does not increase after the physical stimulus, i.e., the index of determination is equal to or less than the predetermined threshold.

As illustrated in FIG. 6, when the marker value increases after the physical stimulus, the determining function 115 determines positive (+) in the second determination even when the primary determination indicates on or near the borderline. After that, the determining function 115 outputs the result of determination (S210), and the sequence of FIG. 4 is completed.

As described above, with the diagnosis assistant according to the present embodiment, when the primary determination is not positive, it is performed the secondary determination according to the index of determination for the marker values in the liquid biopsies before and after the mammography imaging.

With this configuration, even when there is possibility that the liquid biopsy may show false negative in the primary determination, it is possible to determine positive if the index of determination increases along with the physical stimulus. This can ensure the accuracy of determination even for an early cancer when an amount of the biomarker in blood is small or when a measured value of the biomarker is on or near the borderline, which makes it possible to reduce the risk of false negative. This can reduce the risk of a small lesion overlooked and realize an early detection of a malignant tumor for which the marker value is likely to increase along with a physical stimulus. Moreover, the result of the liquid biopsy obtained when the index of determination increases is information about a lesion in the target site to which the physical stimulus is applied. Therefore, when for example a compression pressure during the mammography imaging is used, this contributes to distinguishing breast cancer than the other cancers. Therefore, the diagnosis assistant according to the present embodiment can appropriately assist diagnosis with a liquid biopsy.

Moreover, the secondary determination is not performed when the primary determination is positive or when the intensity of the physical stimulus is low, which allows a reduction in costs for the secondary determination. Note that when the medical treatment data includes a medical history of a patient's family member, an aspect is possible in which the secondary determination is performed when the patient is determined to be a high risk patient based on the medical history of the patient's family member.

Second Embodiment

Note that, with the diagnosis assistant according to the above-mentioned embodiment, when the marker value increases after the physical stimulus, the determining function 115 may determine positive (+) in the secondary determination even when the primary determination is negative. In other words, with the diagnosis assistant according to the present embodiment, even when the liquid biopsy is equal to or less than the reference value, it is determined positive if a remarkable increase is found in the marker value after the physical stimulus. With this configuration, the sensitivity of detection can be improved for a highly invasive cancer whose marker value increases by a physical stimulus such as a compression even when an absolute amount of the biomarker is less because of its small lesion, etc., in other words, a cancer having a high malignancy grading.

Third Embodiment

Note that, with the diagnosis assistant according to each of the above-mentioned embodiments, the image diagnosis based on a medical image may be unperformed. More particularly, each of the primary determination and the secondary determination may be performed only based on the results of the liquid biopsies. Still more particularly, when the result of liquid biopsy is not positive in the primary determination, the diagnosis assistant according to the present embodiment performs the secondary determination according to the index of determination for the marker values in the liquid biopsies before and after the mammography imaging. This configuration also produces the same effects as the above-mentioned embodiments.

Fourth Embodiment

Note that, with the diagnosis assistant according to each of the above-mentioned embodiments, even when it is determined positive (+) in the image diagnosis, the determining function 115 may perform the secondary determination if it is determined negative (−) in the liquid biopsy. For example, the determining function 115 determines whether or not the liquid biopsy is positive at the processing of S204 as illustrated in FIG. 4. With this configuration, for a test that uses both the image diagnosis and the liquid biopsy, false positives in the image diagnosis can be reduced.

Fifth Embodiment

Note that although each of the above-mentioned embodiments exemplifies diagnosis assistant in which a determination is performed on presence/absence of a lesion, it is not limited thereto. With the diagnosis assistant according to each of the above-mentioned embodiments, a determination may be performed on a property of a lesion instead of or in addition to the determination on presence/absence of a lesion. The property of a lesion is herein invasion or malignancy grading of the lesion, for example.

As an example, for the detecting function 113, the processing circuitry 11 performs detection for at least one of presence/absence and property of the lesion based on a medical image obtained by imaging the subject. It is assumed that the CAD according to the present embodiment automatically detects presence/absence of a lesion and position of the lesion on the medical image based on the predetermined detection condition or generates information about qualitative diagnosis based on a diagnosis reference for the lesion automatically detected. It is assumed that the diagnosis reference is predetermined in compliance with guidelines, etc., determined by the hospital or academic conference, etc., and stored in the storage circuitry 13 or the like. Note that the CAD may perform processing about a lesion that is manually input by a doctor, etc., who performs the test.

As an example, for the determining function 115, the processing circuitry 11 performs a determination on at least one of presence/absence and property of a lesion based on the marker values before and after the physical stimulus is applied. The processing circuitry 11 performs a determination on at least one of presence/absence and property of a lesion further based on a result of image diagnosis, such as CAD.

As an example, for the determining function 115, when it is not determined positive in the primary determination, the processing circuitry 11 calculates the index of determination on the marker values before and after the physical stimulus and performs the secondary determination on at least one of presence/absence and property of a lesion based on the calculated index of determination. For example, the processing circuitry 11 determines a lesion being present when the index of determination is greater than the predetermined threshold in the secondary determination. For example, the processing circuitry 11 determines the malignancy grading being high as the property of the lesion when the index of determination is greater than the predetermined in the secondary determination. This is based on the fact that a cancer having a biomarker likely to leak into blood by a breast compression may be a highly invasive cancer that is located near a blood vessel or lymph vessel and leaks much into the blood vessel or lymph vessel or a cancer that has many neovascular vessels and that grows actively, and such a cancer may have a high risk of metastasis and its malignancy grading may be high. For example, the processing circuitry 11 determines the malignancy grading being low as the property of the lesion, when the index of determination is equal to or less than the predetermined threshold in the secondary determination. This is based on the fact that a calcified lesion having a less leakage of a biomarker may usually be a non-invasive cancer that remains in breast ducts and that is less invasive, and its malignancy grading may be low.

As described above, the diagnosis assistant according to the present embodiment performs at least one of presence/absence and property of a lesion based on the marker values before and after the physical stimulus is applied. This configuration enables a determination on the malignancy grading and the invasion of the lesion, i.e., the property of the lesion based on an increase in the marker value along with the physical stimulus. Moreover, this enables acquiring information about a lesion's microenvironment (property), such as being located near a blood vessel or lymph vessel, based on an increase in the marker value along with the physical stimulus.

Sixth Embodiment

Note that, with the diagnosis assistant according to each of the above-mentioned embodiments, the collection of the liquid sample and the liquid biopsy after the physical stimulus may be unperformed As an example, the collection of the liquid sample and the liquid biopsy after the physical stimulus are performed when it is not determined as positive in the primary determination or when the intensity of the physical stimulus is greater than the predetermined threshold. In other words, for the acquiring function 111, when it is not determined positive in the primary determination or when the intensity of the physical stimulus is greater than the predetermined threshold, the processing circuitry 11 acquires the result of the liquid biopsy performed after the physical stimulus. Then, for the determining function 115, the processing circuitry 11 calculates the index of determination and performs the secondary determination based on the calculated index of determination with the result of the liquid biopsy performed after the physical stimulus being acquired.

With this configuration, neither the collection of the blood sample nor the liquid biopsy after the physical stimulus is performed regardless of the secondary determination when it is determined positive in the primary determination or when the intensity of the physical stimulus is low. This enables a reduction in costs for the test and loads on the patient.

The wording "processor" used in the above explanation means, for example, circuitry such as a CPU, a GPU, an ASIC, a programmable logic device (PLD), etc. The PLD includes a simple programmable logic device (SPLD), a complex programmable logic device (CPLD), and a field programmable gate array (FPGA). The processor implements a function by reading a program stored in storage circuitry and executing the program. The storage circuitry in which the program is stored is a non-transitory computer readable storage medium. Note that it is allowable to incorporate the program directly into circuitry of the processor, instead of storing the program in the storage circuitry.

In this case, the processor implements the function by reading the program incorporated into the circuitry and executing the program. Moreover, the function corresponding to the program may be implemented by a combination of logical circuits, not by executing the program. Note that the respective processors of the present embodiment are not limited to be formed as a single circuit for each processor. It is allowable to form a single processor by combining two or more independent circuits together, thereby implementing their functions. Furthermore, it is allowable to integrate any two or more of the components as illustrated in FIG. 2 with a single processor, thereby implementing their functions.

With at least one embodiment of the embodiments as described above, it is possible to appropriately assist a diagnosis using a liquid biopsy.

While certain embodiments have been described, these embodiments have been presented by way of example only, and are not intended to limit the scope of the inventions. These embodiments can be embodied in a variety of other forms, and various omissions, substitutions and changes can be made without departing from the spirit of the invention. These embodiments and their modifications are included in the scope and gist of the invention, and further included in the invention as described in the scope of claims and their equivalents.

Regarding the above embodiments, the following notes are disclosed as aspects and selectable features of the invention.

Note 1-1

A diagnosis assistant apparatus comprising a processor, the processor is configured to:
acquire a first measured value of a biomarker in a first liquid sample that is collected from a subject before a physical stimulus is applied and a second measured value of the biomarker in a second liquid sample that is collected from the subject after the physical stimulus is applied; and
perform a determination on at least one of presence/absence and a property of a lesion based on the first measured value and the second measured value.

Note 1-2

A diagnosis assistant system comprising:
the diagnosis assistant apparatus; and
a measurement apparatus configured to acquire the first measurement value by measuring an amount of the biomarker in the first liquid sample and the second measurement value by measuring an amount of the biomarker in the second liquid sample.

Note 1-3

A diagnosis method comprising:
collecting a first liquid sample from a subject before a physical stimulus is applied;
collecting a second liquid sample from the subject after the physical stimulus is applied;
acquiring a first measured value of a biomarker in the first liquid sample and a second measured value of the biomarker in the second liquid sample; and
performing a determination on at least one of presence/absence and a property of a lesion based on the first measured value and the second measured value.

Note 1-4

A non-transitory computer readable medium readable by a computer, the medium storing a program that, when executed by a computer, causes the computer to perform:
acquiring a first measured value of a biomarker in a first liquid sample that is collected from a subject before a physical stimulus is applied and a second measured value of the biomarker in a second liquid sample that is collected from the subject after the physical stimulus is applied; and
performing a determination on at least one of presence/absence and a property of a lesion based on the first measured value and the second measured value.

Note 2

It may be calculated an index of determination indicating at least one of an amount or a ratio by which the second measured value increases from the first measured value, and the determination may be performed based on the calculated index of determination.

Note 3

A determination condition for the determination may be changed when the index of determination is greater than a predetermined threshold.

Note 4

It may be acquired information about an intensity of the physical stimulus.

The index of determination may be calculated when the intensity of the physical stimulus is greater than a predetermined threshold.

Note 5

The physical stimulus may be a compression to a breast for mammography imaging.

Note 6

The physical stimulus may be an ultrasonic irradiation to the subject.

Note 7

It may be performed a detection of at least one of presence/absence and property of the lesion based on a medical image that is obtained by imaging the subject.

The medical image may be acquired further.

The determination may be performed further based on a result of the detection.

Note 8

It may be calculated an index of determination indicating at least one of an amount or a ratio by which the second measured value increases from the first measured value, and a detection condition for the detection may be changed when the index of determination is greater than a predetermined threshold.

Note 9

The changing the detection condition may include changing a detection algorism for detecting at least one of presence/absence and a property of a lesion from the medical image to a detection algorism corresponding to a type of a biomarker increased after the physical stimulus.

Note 10

The lesion may include breast cancer, liver cancer, kidney cancer, prostate cancer, hepatic cancer, pancreas cancer, bladder cancer, bowel cancer, stomach cancer, esophageal cancer, uterus cancer, skin cancer, or lung cancer.

Note 11
The determination may include
a first determination in which the lesion is determined to be present when the first measured value or the second measured value is greater than a predetermined threshold, and
a second determination in which the lesion is determined to be present when the index of determination is greater than a predetermined threshold.
When the lesion is not determined to be present in the first determination, the index of determination may be calculated and the second determination based on the index of determination may be performed.

Note 12
The determination may include
a first determination in which the lesion is determined to be present when the first measured value or the second measured value is greater than a predetermined threshold, and
a second determination in which malignancy grading is determined to be high as the property of the lesion when the index of determination is greater than a predetermined threshold.
When the lesion is not determined to be present in the first determination, the index of determination may be calculated and the second determination based on the index of determination may be performed.

Note 13
The determination may include a first determination in which the lesion is determined to be present when the first measured value is greater than a predetermined threshold.
When the lesion is not determined to be present in the first determination, the second measured value may be acquired.
When the lesion is not determined to be present in the first determination, the index of determination may be calculated and a second determination on at least one of presence/absence and a property of the lesion may be performed based on the calculated index of determination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A diagnosis assistant apparatus, comprising: a processor configured to:
acquire a first measured value of a biomarker in a first liquid sample that is collected from a subject before a physical stimulus is applied and a second measured value of the biomarker in a second liquid sample that is collected from the subject after the physical stimulus is applied; and
perform a determination on at least one of a presence/absence and a property of a lesion based on the first measured value and the second measured value.

2. The diagnosis assistant apparatus according to claim 1, wherein the processor calculates an index of determination indicating at least one of an amount and a ratio by which the second measured value increases from the first measured value, and the processor performs the determination based on the calculated index of determination.

3. The diagnosis assistant apparatus according to claim 2, wherein the processor changes a determination condition for the determination when the index of determination is greater than a predetermined threshold.

4. The diagnosis assistant apparatus according to claim 2, wherein
the processor acquires information about an intensity of the physical stimulus, and
the processor calculates the index of determination when the intensity of the physical stimulus is greater than a predetermined threshold.

5. The diagnosis assistant apparatus according to claim 1, wherein the physical stimulus is a compression to a breast for mammography imaging.

6. The diagnosis assistant apparatus according to claim 1, wherein the physical stimulus is an ultrasonic irradiation to the subject.

7. The diagnosis assistant apparatus according to claim 1, wherein the processor
performs a detection of at least one of the presence/absence and the property of the lesion based on a medical image that is obtained from imaging the subject,
further acquires the medical image, and
performs the determination further based on a result of the detection.

8. The diagnosis assistant apparatus according to claim 7, wherein the processor calculates an index of determination indicating at least one of an amount or a ratio by which the second measured value increases from the first measured value, and changes a detection condition for the detection when the index of determination is greater than a predetermined threshold.

9. The diagnosis assistant apparatus according to claim 8, wherein the changing the detection condition includes changing a detection algorithm for detecting at least one of the presence/absence and the property of a lesion from the medical image to a detection algorithm corresponding to a type of a biomarker increased after the physical stimulus.

10. The diagnosis assistant apparatus according to claim 1, wherein the lesion includes breast cancer, liver cancer, kidney cancer, prostate cancer, hepatic cancer, pancreas cancer, bladder cancer, bowel cancer, stomach cancer, esophageal cancer, uterus cancer, skin cancer, or lung cancer.

11. The diagnosis assistant apparatus according to claim 2, wherein
the determination includes
a first determination in which the lesion is determined to be present when the first measured value or the second measured value is greater than a first predetermined threshold, and
a second determination in which the lesion is determined to be present when the index of determination is greater than a second predetermined threshold, and
when the lesion is not determined to be present in the first determination, the processor calculates the index of determination and performs the second determination based on the index of determination.

12. The diagnosis assistant apparatus according to claim 2, wherein
the determination includes
a first determination in which the lesion is determined to be present when the first measured value or the second measured value is greater than a first predetermined threshold, and a second determination in which a malignancy grading is determined to be high as the property of the lesion when the index of determination is greater than a second predetermined threshold, and when the lesion is not determined to be present in the first determination, the processor calculates the index of determination and performs the second determination based on the index of determination.

13. The diagnosis assistant apparatus according to claim 2, wherein the determination includes a first determination in which the lesion is determined to be present when the first measured value is greater than a predetermined threshold, and when the lesion is not determined to be present in the first determination, the processor acquires the second measured value, and calculates the index of determination and performs a second determination on at least one of the presence/absence and the property of the lesion based on the calculated index of determination.

14. A diagnosis method comprising:

collecting a first liquid sample from a subject before a physical stimulus is applied;

collecting a second liquid sample from the subject after the physical stimulus is applied;

acquiring a first measured value of a biomarker in the first liquid sample and a second measured value of the biomarker in the second liquid sample; and performing a determination on at least one of a presence/absence and a property of a lesion based on the first measured value and the second measured value.

15. A non-transitory computer readable medium readable by a computer, the medium storing a program that, when executed by a computer, causes the computer to perform:

acquiring a first measured value of a biomarker in a first liquid sample that is collected from a subject before a physical stimulus is applied and a second measured value of the biomarker in a second liquid sample that is collected from the subject after the physical stimulus is applied; and performing a determination on at least one of a presence/absence and a property of a lesion based on the first measured value and the second measured value.

* * * * *